United States Patent
Bradley et al.

(10) Patent No.: US 9,934,818 B1
(45) Date of Patent: Apr. 3, 2018

(54) AUTOMATED SEAMLESS VIDEO LOOP

(71) Applicant: Apple Inc., Cupertino, CA (US)

(72) Inventors: Arwen V. Bradley, Portland, OR (US); Samuel G. Noble, Portland, OR (US); Rudolph van der Merwe, Portland, OR (US); Jason Klivington, Portland, OR (US); Douglas P. Mitchell, Lake Forest Park, WA (US); Duncan Robert Kerr, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/275,146

(22) Filed: Sep. 23, 2016

(51) Int. Cl.
| | |
|---|---|
| *H04N 5/93* | (2006.01) |
| *G11B 27/00* | (2006.01) |
| *H04N 9/80* | (2006.01) |
| *G11B 27/034* | (2006.01) |
| *H04N 5/783* | (2006.01) |
| *G11B 27/34* | (2006.01) |
| *H04N 9/74* | (2006.01) |

(52) U.S. Cl.
CPC .......... *G11B 27/007* (2013.01); *G11B 27/034* (2013.01); *G11B 27/34* (2013.01); *H04N 5/783* (2013.01)

(58) Field of Classification Search
CPC ... H04N 5/93; H04N 9/80; H04N 9/74; G11B 27/00
USPC ................. 386/280, 248, 239, 278; 348/578
See application file for complete search history.

(56) References Cited

U.S. PATENT DOCUMENTS

| | | | |
|---|---|---|---|
| 6,636,220 B1 | 10/2003 | Szeliski | |
| 8,503,490 B2 | 8/2013 | Todo | |
| 8,886,017 B2 | 11/2014 | Kosaka | |
| 9,082,198 B2 | 7/2015 | Mashiah | |
| 2003/0156113 A1 | 8/2003 | Freedman | |
| 2013/0051771 A1 | 2/2013 | Yamada | |
| 2013/0229581 A1* | 9/2013 | Joshi | G11B 27/031 348/584 |
| 2014/0071287 A1 | 3/2014 | Tu | |
| 2014/0327680 A1 | 11/2014 | Hoppe | |
| 2016/0086368 A1 | 3/2016 | Laaksonen | |

(Continued)

FOREIGN PATENT DOCUMENTS

WO    2014188235 A1    11/2014

OTHER PUBLICATIONS

Conley, et al., "Motion Stills—Create beautiful GIFs from Live Photos," Jun. 7, 2016 Retrieved from the Internet: URL: https://research.googleblog.com/2016/06/motion-stills-create-beautiful-gifs.html?m=1.

(Continued)

*Primary Examiner* — Daquan Zhao
(74) *Attorney, Agent, or Firm* — Blank Rome LLP

(57) ABSTRACT

Techniques and devices for creating an AutoLoop output video by adding synthetic camera motion to the AutoLoop output video. The AutoLoop output video is created from a set of frames. After generating the AutoLoop output video based on a plurality of loop parameters and at least a portion of the frames, synthetic camera motion is combined with the AutoLoop output video. The synthetic camera loop is based on the subset of the input frames and exhibits some amount of camera motion for the subset of the input frames. Once the synthetic camera loop is generated, the synthetic camera loop and the video loop is combined to enhance the AutoLoop output video.

20 Claims, 7 Drawing Sheets

(56) References Cited

U.S. PATENT DOCUMENTS

2017/0032819 A1  2/2017  Sevilla-Lara
2017/0098464 A1  4/2017  Wang

OTHER PUBLICATIONS

Liao, et al., "Automated Video Looping with Progressive Dynamism," ACM Trans. Graphics (SIGGRAPH), 32(4), 2013.
Bai, et al., "Automatic cinemagraph portraits," In Computer Graphics Forum, vol. 32, pp. 17-25, Wiley Online Library, 2013.
Bai, et al., "Selectively de-animating video," ACM Trans. Graph., 31(4):66, 2012.
Beck, et al., "Cinemagraphs," 2012.
Boykov, et al., "An experimental comparison of min-cut/max-flow algorithms for energy minimization in vision," Pattern Analysis and Machine Intelligence, IEEE Transactions on, 26(9):1124-1137, 2004.
Boykov, et al., "Fast approximate energy minimization via graph cuts," Pattern Analysis and Machine Intelligence, IEEE Transactions on, 23(11):1222-1239, 2001.
Cohen, et al., "The moment camera," Computer, 39(8):40-45, 2006.
Horn, B. K. P. & Schunck, B. G., "Determining Optical Flow," Artificial Intelligence 17, 185-203, 1981.
Joshi, et al., "Cliplets: juxtaposing still and dynamic imagery," In Proceedings of the 25th annual ACM symposium on User interface software and technology, pp. 251-260, ACM, 2012.
Kolmogorov, et al., "What engergy functions can be minimized via graph cuts?," Pattern Analysis and Machine Intelligence, IEEE Transactions on, 26(2):147-159, 2004.
Lucas et al., "An iterative image registration technique with an application to stereo vision," In Proceedings of the 7th international joint conference on Artificial Intelligence-vol. 2 (IJCAI '81), 1981, vol. 2, pp. 674-679.
Schodl, et al., "Video textures," In Proceedings of the 27th annual conference on Computer graphics and interactive techniques, pp. 489-498, ACM Press/Addison-Wesley Publishing Co., 2000.
Tompkin, et al., "Towards moment imagery: Automatic cinemagraphs," In Visual Media Production (CVMP), 2011 Conference for, pp. 87-93, IEEE, 2011.
Zhou, et al., "Learning deep features for scene recognition using places database," IN Advances in Neural Information Precessing Systems, pp. 487-495, 2014.

* cited by examiner

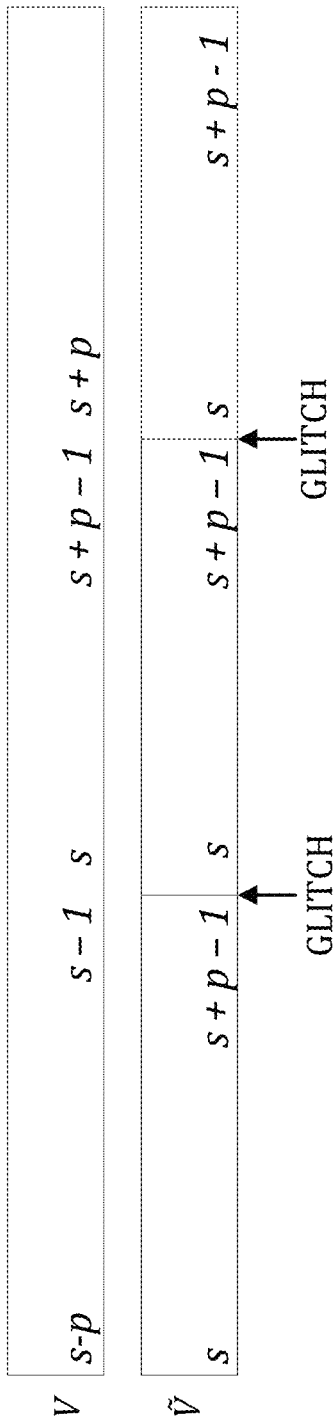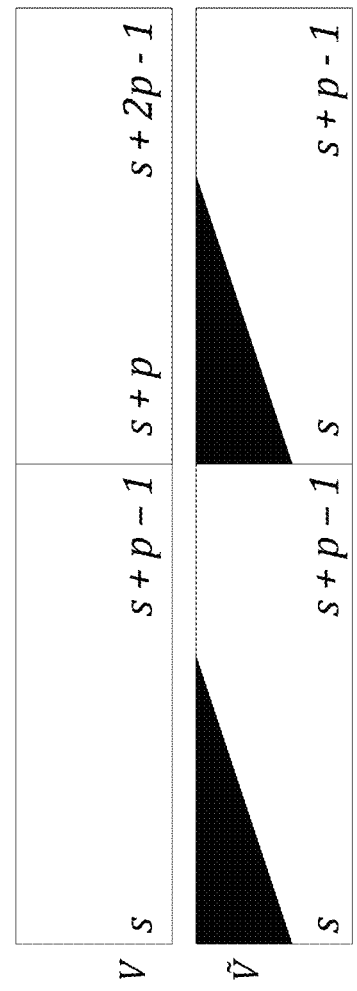
FIG. 4A
FIG. 4B

AUTOMATED SEAMLESS VIDEO LOOP

BACKGROUND

This disclosure relates generally to the field of video processing, and more particularly, but not by way of limitation, this disclosure relates to automatically creating a seamless video loop from a casually shot handheld video or a sequence of images.

Visual imagery can generally be classified as either a static image (e.g., photograph, painting, etc.) or a dynamic image (e.g., video, animation, etc.). A static image captures a single instant in time while a dynamic image can provide an unfolding temporal narrative through time. Differing types of short videos can be created from multiple static images or a dynamic image. Examples of short videos include cinemagraphs and cliplets, which selectively freeze, play, and loop video regions to achieve compelling effects. For instance, cinemagraphs can commonly combine static scenes with small repeating movements (e.g., a hair wisp blowing in the wind); thus, some motion and narrative can be captured in a cinemagraph. In a cinemagraph, the dynamic element is commonly looping in a series of frames to create a video loop. In order to create smoother animations and minimize visual artifacts, a user may create cinemagraphs by using pre-planned, tripod-mounted footage and subsequently manually identify relevant frames that produce a smooth video loop. However, a user may wish to automatically create a video loop from different types of video inputs, such as handheld videos or static images taken with a portable device that produce the same quality as pre-planned cinemagraphs but without the painstaking effort and time consumption.

SUMMARY

In one embodiment, the disclosure provides a method for an automated seamless video loop created from a dynamic input video or from multiple static images. The output video loop is created by identifying optimal loops within short video clips or multiple frames. The method of automatically creating the video loop includes receiving a handheld raw input video and stabilizing the input video using one or more video stabilization operations, such as a tripod-mode operation or a smoothing mode operation. After stabilization, the method determines loop parameters including crossfade in the stabilized video using one or more AutoLoop parameter selection operations. The crossfade blends one or more frames temporally located before and/or after the loop period with frames at the beginning of the output video loop.

In another embodiment, the method applies a consensus AutoLoop operation or a per-pixel AutoLoop operation during loop parameter determination. In a consensus AutoLoop operation, a search is performed for a consecutive series or sequence of frames of the input video that form a seamless loop. The method applies a cross-fade to smooth any temporal discontinuities and to improve looping quality. The per-pixel AutoLoop operation is computationally more intensive and assigns different start times and periods for each pixel individually, to optimize both temporal and spatial smoothness. For a consensus based output video loop, the result is a short video segment representing the loop with crossfade, which can be displayed as a looping video, or can be stored as an animated image (a GIF, for example). A per-pixel based output video loop produces a custom storage format and uses a custom player to render the output video loop. The loop parameters are used to generate the output video loop with crossfade to provide a relatively higher quality video loop. The method allow users to create shareable animated images (e.g., GIFs) or create animated backgrounds. Handheld raw input videos and images can be automatically transformed into interactive moving photographs that produce smoothly looped video.

In another embodiment, the method automatically creates a video loop that limits user interaction by performing pregate and preprocessing operations. The method uses preprocessing operations to reduce a received input video and/or the number of images to an appropriate length that an AutoLoop pipeline is capable of managing. When performing preprocessing operations, the method identifies one or more points-of-interest within the input video. Based on the identified points-of-interest, the method trims out a portion of the input video that contains the points-of-interest. The method can also reduce the input video and/or the number of images by subsampling the input videos and/or images and subsequently play the input videos and/or images at a higher frame rate. The method performs pregate operations to determine whether content of an input video or sequence of frames are suitable for creating a video loop. The pregate operations implement a pass and/or fail decision and/or assign a pregate score using one or more image features. The pregate operations include analyzing image features using a junk detector, face detector, motion features, and/or other pregate classifiers to determine whether the input video or multiple images could potentially produce a relatively high quality video loop.

In another embodiment, the method automatically creates a video loop that limits user interaction by performing postgate operations. The postgate operations evaluate whether an output video loop can be classified as a relatively high quality video loop. When performing postgate operations, the method evaluates one or more dynamism parameters that are based on the variability and dynamic ranges for one or more pixels. If the dynamism parameters exceed one or more postgate thresholds, the method determines that the video loop sequence is a relatively high quality video loop.

In another embodiment, the method generates a video loop by obtaining an input video and/or multiple images and applying a stabilization operation to the input video and/or multiple images to generate a plurality of stabilized frames. The method can generate a video loop based on loop parameters and using at least a portion of the stabilized frames. The frames within the video loop correspond to a subset of the input video and/or multiple images. The method then generates a synthetic camera loop based on the subset of the input video and/or multiple images such that the synthetic camera loop exhibits some amount of camera motion in the loop. Afterwards, the method combines the video loop and the synthetic camera loop to generate an output video loop.

In one embodiment, each of the above described methods, and variation thereof, may be implemented as a series of computer executable instructions. Such instructions may use any one or more convenient programming language. Such instructions may be collected into modules and/or programs and stored in any media that is readable and executable by a computer system or other programmable control device.

BRIEF DESCRIPTION OF THE DRAWINGS

FIG. 4A illustrates a diagram used to determine loop parameters and loop period using a consensus AutoLoop operation without crossfade in accordance with one embodiment.

FIG. 4B illustrates a diagram used to determine loop parameters and loop period using a consensus AutoLoop operation in accordance with one embodiment.

DESCRIPTION

Figure 1:
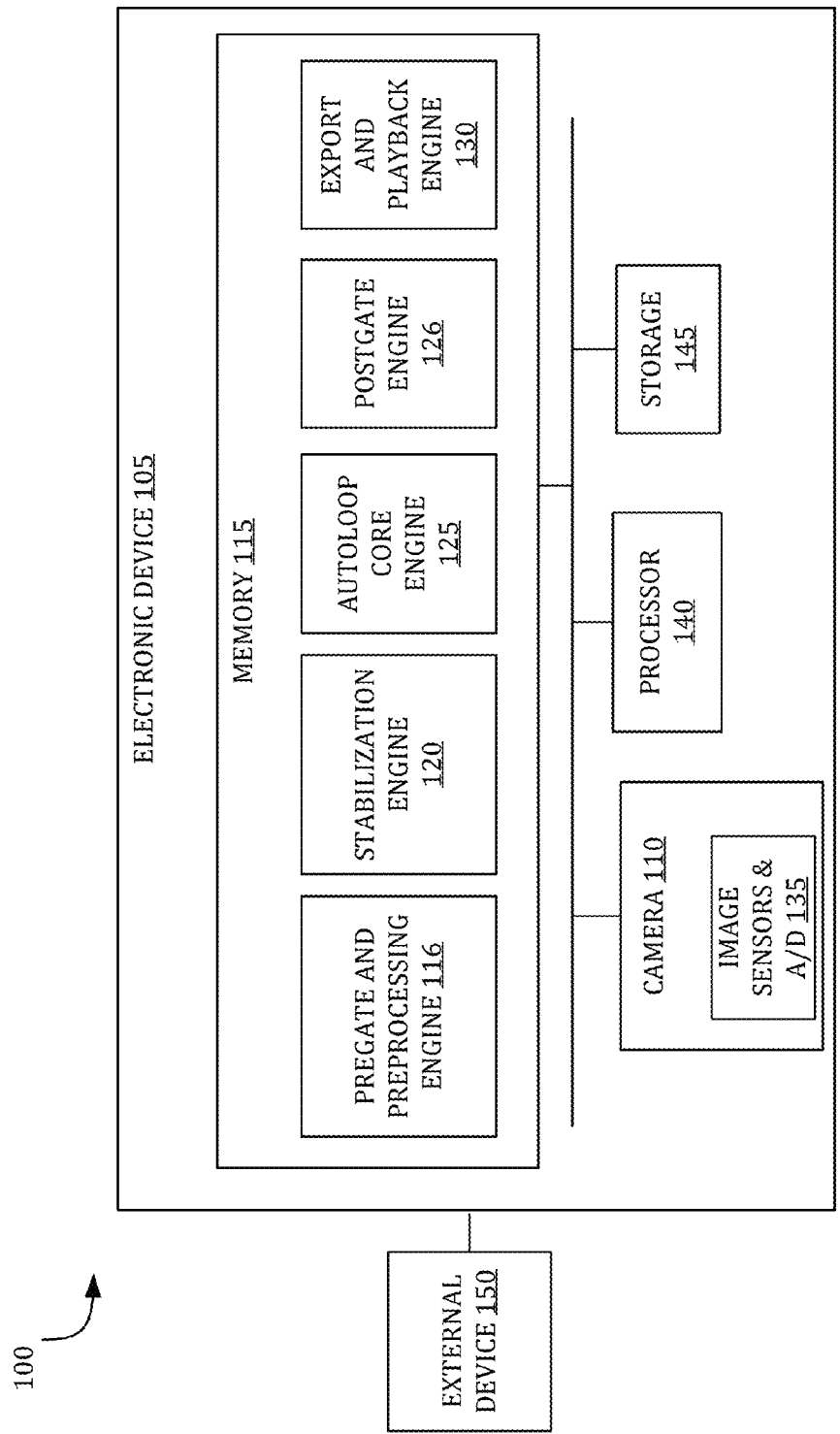
FIG. 1 depicts a simplified block diagram of a system in accordance with one embodiment.

This disclosure includes various example embodiments for creating output video loops (hereinafter "AutoLoop output video"). Specifically, one or more embodiments create an AutoLoop output video from handheld raw input videos or a series of images encoded using one or more color representations (e.g., YCbCr or RGB format). AutoLoop output videos may be created from short burst video clips of at least one second, burst sequences, iris frame sequences (e.g., live photos), slow motion video clips, or time-lapse videos. The pipeline for creating an AutoLoop output video can include obtaining a raw input video and/or a sequence of images, performing pregate and preprocessing operations, stabilizing the raw input video using one or more stabilization operations, selecting and optimizing AutoLoop parameters, adding synthetic camera motion, and performing postgate operations. In the described illustrative embodiments, either a consensus AutoLoop operation or a per-pixel AutoLoop operation may be applied to determine the loop parameters, such as a starting frame, a loop period, and crossfade length. The techniques disclosed herein regarding creating automated seamless video loops are applicable to any number of electronic devices, such as digital cameras, digital video cameras, mobile phones, personal data assistants (PDAs), portable entertainment players, and, of course, desktop, laptop, and tablet computer systems.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

FIG. 1 shows, in block diagram form, an overall view of a system 100 for creating an automated seamless AutoLoop output video. In one embodiment, system 100 may generate an AutoLoop output video without additional user interaction beyond selecting an input video or multiple images (e.g., a series and/or a sequence of images) to create the AutoLoop output video. To achieve a moving photograph effect, an AutoLoop output video may include dynamic scene elements that move against a stationary background. The system 100 may create the AutoLoop output video using casually shot, handheld videos rather than using input videos shot with a tripod. The system 100 may not request for other user interactions, such as manually identifying loopable frames and/or manually using tools that offload the video content onto computer systems. Additionally or alternatively, the system 100 may operate in an automatic mode, where system 100 further minimizes user interactions by automatically creating the AutoLoop output video without having a user specify the input video for creating an AutoLoop output video. Instead, in automatic mode, system 100 may autonomously select and/or determine whether system 100 is able to create an AutoLoop output video for a given input video using pregate and postgate operations.

FIG. 1 illustrates that system 100 may implement an AutoLoop pipeline that comprises obtaining an input video, performing pregate and preprocessing operations on the input video, stabilizing the input video, detecting loop parameters and baking out or creating, using loop parameters, the AutoLoop output video with crossfade, performing postgate analysis of the AutoLoop output video, and playing back the AutoLoop output video on a display device. Other embodiments of system 100 may have an AutoLoop pipeline that allows a user to select an input video and bypass performing pregate operations and/or postgate operations. Video stabilization can include a cascade of video stabilization operations including a tripod-direct mode, a tripod-sequential mode, and/or a sequential-smoothing mode. After stabilization, the system 100 may implement an AutoLoop operation to select and determine one or more optimal loop parameters. Once the loop parameters are determined, a crossfade may be added to smooth out any temporal and spatial discontinuities in the AutoLoop output video.

As shown in FIG. 1, system 100 includes an electronic device 105 that may represent a computer system that performs the AutoLoop pipeline. Electronic device 105 may be connected to other network devices across a network, such as mobile devices, tablet devices, desktop devices, as well as network storage devices such as servers and the like. In various embodiments, electronic device 105 may be a desktop computer, a laptop computer, a video-game console, an embedded device, a smart phone, tablet computer, personal digital assistant, portable music/video player, and/or any other electronic device that includes a camera system configured to obtain and process videos and images including series and/or sequences of images.

Electronic device 105 may include a camera 110, memory 115, sensors 135, central processing unit (CPU) 140, and data storage 145. Camera 110 may include an image sensor, a lens stack, and other components that may be used to capture images. In one or more embodiments, the camera may be part of the user device, such as the electronic device 105, and may be front-facing or rear facing such that the camera is able to capture images in front of a screen or behind the screen. Also illustrated in FIG. 1 is image sensors & analog-to-digital converter (S&A/D) 135 that may form part of camera 110. S&A/D 135 can include accelerometers, gyroscopes, or the like. S&A/D 135 may be configured to receive an analog signal representing an image, and to convert the received signal into digital image data that, in one embodiment, may be a series of individual blocks of digital image data representing an intensity of light that may be received through various photo-detectors of an image sensor and/or lens arrangement. S&A/D 135 may then provide the digital data to CPU 140 for processing.

Processor 140 may be a system-on-chip such as those found in mobile devices and include one or more dedicated graphics processing units (GPUs). Processor 140 may be configured to perform a variety of calculations on video and/or series of images that are obtained over a network or captured using camera 110. Processor 140 may be configured to control various operations of system 100 in response to computer-readable instructions that may be stored within one of the memory devices 115 or storage 145 of FIG. 1. Memory 115 and storage 145 may each include one or more different types of memory, which may be used for performing device functions in conjunction with processor 140. For example, memory 115 and storage 145 may include cache, Read-Only Memory (ROM), and/or Random-Access Memory (RAM). Memory 115 and storage 145 may store various processing engines for creating AutoLoop output video and implementing the AutoLoop pipeline. As shown in FIG. 1, the electronic device 105 may include a pregate and preprocessing engine 116, a stabilization engine 120, an AutoLoop core engine 125, a postgate engine 126, and an export/playback engine 130. In one embodiment, at least some of data and/or instructions stored in memory 115 and storage 145 may also be stored on another device of electronic device 105, including, but not limited to external device 150 such as CD-ROM/DVD-ROM, hard disk drive, or other computer-readable storage device resident on electronic device 105 or accessible by electronic device 105 over a network. Each engine 116, 120, 125, 126, and 130 may include one or more algorithms that provide a sequence of computing instructions executable by processor 140 to perform a variety of computing operations (e.g., operation 200 in FIG. 2) that process the input video or a series of images to generate the AutoLoop output video.

In one embodiment, for the electronic device 105 to automatically create an AutoLoop output video and minimize user interaction, the electronic device 105 may include a pregate and preprocessing engine 116. The pregate and preprocessing engine 116 may perform preprocessing operations that reduce a received input video and/or the number of images to an appropriate length. The input video and/or images may be captured, for example, by camera 110 or received by electronic device 105 from an external device 150 over a network from a server or other external devices (not shown). To perform preprocessing operations, the pregate and preprocessing engine 116 may identify one or more segments of the input video and/or multiple images that could be suitable for generating an AutoLoop output video. The AutoLoop output video is generally intended to be relatively short according to the processing time scales and the number frames. As such, the pregate and preprocessing engine 116 may trim or subsample longer inputs down to manageable lengths (e.g., several seconds). As part of the preprocessing operations, the pregate and preprocessing engine 116 may also check and verify that the shortened input captures appropriate content. Performing preprocessing operations are discussed in more detail in steps 206 and 210 of FIG. 2.

The pregate and preprocessing engine 116 may also perform pregate operations when operating in automatic mode. The electronic device 105 performs pregate operations to determine whether the content of the input video or multiple images are suitable for creating an AutoLoop output video. As opposed to a user-directed path (i.e., operating in a manual mode) in which a user requests to create an AutoLoop output video from a particular input, implementing an autonomous path (i.e., automatic mode) may initially include a determination whether or not to create an AutoLoop output video for a given input video. The pregate and preprocessing engine 116 may be configured to make a pass or fail decision and/or assign a pregate score using one or more image features. For example, the pregate and preprocessing engine 116 may implement a rule-based pregate classifier, such as a support vector machine (SVM), regression or regularized regression classifier, multilayer perceptron, and/or other classifier operation that are similar and trained from labeled data. If the pregate score exceeds one more pregate threshold values, the pregate and preprocessing engine 116 determine that the given input video is compatible with creating an AutoLoop output video.

To determine whether to automatically create an AutoLoop output video for a given input video and/or multiple images, the pregate and preprocessing engine 116 may analyze one or more image features for one or more frames within an input video. In one embodiment, the pregate and preprocessing engine 116 may analyze features based on results of a junk detector, a face detector, a scene classifier, and/or motion features. The junk detector may identify a variety of objects within one or more images that typically do not produce relatively high quality AutoLoop output videos. Examples of objects a junk detector may identify include receipts, whiteboards, notes, and other object content within an image used to record image information.

Additionally or alternatively, the pregate and preprocessing engine 116 may include a face detector that identifies one or more faces in an image and/or provide bounding boxes and other data related to face recognition. Generally, images that contain faces are less likely to produce relatively high quality AutoLoop output videos. In particular, the AutoLoop core engine 125 sometimes do not produce relatively high quality video loops for images containing faces since face motions may not be naturally periodic. Short loops containing faces can look repetitive and unnatural because humans do not typically move in this manner. In some instances, applying crossfade can cause ghosting that distorts faces in unappealing ways. To address some of these issues regarding faces, the AutoLoop core engine 125 performs operations to compensate for the non-periodic motions, for example, increasing the minimum loop period and reducing the crossfade length.

The pregate and preprocessing engine 116 may also implement a scene classifier and analyze motion features to determine whether an input video and/or multiple images are able to produce AutoLoop output videos. Scene classifiers may label images as containing particular objects or belonging to particular scene categories. The scene categories include, but are not limited to, outdoor and/or indoor environments, such as a beach, concert, waterfall, river, kitchen, and/or restaurants. Input video and/or multiple images that include outdoor and landscape scenery (e.g., waterfall, rivers, lakes, springs, fire, steam, tress, forests, and fields) are generally more compatible with producing AutoLoop output videos. In one embodiment, the scene classifier may be a raw scene classifier configured to analyze raw scene image representation that provide a lower-level raw image representation. The motion features may include a variety of motion data, such as motion data obtained from one or more sensors (e.g., a gyroscope). Motion data, such as optical flow magnitude, may also be used in determining whether to create an AutoLoop output video. For example, the pregate and preprocessing engine 116 may determine that objects within an input video that move very slightly may not produce an acceptable AutoLoop output video. The pregate and preprocessing engine 116 may determine whether objects move very slightly by determining the shift in pixels for the object and/or a pixel's color change (e.g., in quanta units) for a sequence of frames within the input video.

Stabilization engine 120 may be configured to perform video stabilization on the input video and/or multiple images. As shown in FIG. 1, the stabilization engine 120 may obtain the input video and/or multiple images from the pregate and preprocessing engine 116. Stabilization engine 120 may be configured to apply a cascade of stabilization operations on the input video to smooth out jitter, shaking, and/other unintended camera movements. As used herein, "cascade" may refer to iteratively applying one or more operations repeatedly to solve for a solution, or to applying several operations in order until a successful stabilization method or set of parameters is found. The cascade of stabilization operations may contain tripod-mode stabilization operations that include, but are not limited to, a sequential tripod-mode stabilization operation and/or a direct tripod-mode stabilization operation. The cascade of stabilization operations may also contain other stabilization operations, such as smooth-mode stabilization operations, if the tripod-mode stabilization operations are not successful in stabilizing the input video. Additionally or alternatively, the cascade of stabilization operations may include a pass-through mode that applies no stabilization operation if one or more stabilization operations fail. Performing video stabilization is discussed in more detail in FIG. 2.

FIG. 1 illustrates that the AutoLoop core engine 125 may be coupled to the stabilization engine 120. After receiving the stabilized input video, the AutoLoop core engine 125 may be configured to determine loop parameters from the stabilized input video. The AutoLoop core engine 125 may be configured to index the frames in the stabilized input video in order to determine an optimal starting frame 's', a loop period 'p' and, in embodiments, a crossfade length, 'w'. For example, the AutoLoop core engine 125 may be configured to determine loop parameters using a consensus AutoLoop operation or a per-pixel AutoLoop operation. A consensus AutoLoop operation minimizes a temporal energy function to select an optimized starting frame s and a loop period p, which may be defined in frames, to create an AutoLoop by playing frames 's' through 's+p−1' of the input video in a loop. The consensus AutoLoop operation may also add a temporal cross-fade to smooth any remaining temporal discontinuity. A per-pixel AutoLoop operation selects a different start time and period ($s_x$; $p_x$) for each pixel x, with the goal of creating a temporally and spatially seamless loop, so that the resulting AutoLoop can contain many different loops, as well as static regions. The per-pixel AutoLoop operation could potential generate temporally smoother and more complex loops than the consensus AutoLoop operation. However, the consensus AutoLoop operation may be simpler, more robust, and more efficient than the per-pixel AutoLoop operation. Performing AutoLoop operations to determine loop parameters is discussed in more detail in step 225 of FIG. 2.

In one embodiment, the AutoLoop core engine 125 may add synthetic camera motion back into the AutoLoop output video to create a more handheld-based video. Once, the AutoLoop core engine 125 determines the loop parameters for the AutoLoop output video, the AutoLoop core engine 125 may compute a smooth looping version of the selected video loop by looping selected input frames multiple times and selecting a portion of the smooth synthetic camera loop as the synthetic camera motion (e.g. center smoothing segment). When computing the synthetic camera motion, the AutoLoop core engine 125 smooths the camera trajectory for frames taken from the input video and/or image that correspond to the selected frames in the AutoLoop output video. This stabilization process produces a smooth synthetic camera loop without first being stabilized using a tripod-mode stabilization operation. The synthetic camera motion loop includes some amount of camera motion to produce a more organic feel, but without the shaking or jerkiness caused from unintended camera movements. Afterwards, the AutoLoop core engine 125 may add the synthetic camera motion (e.g., center smoothing segment) back into the AutoLoop output video by applying the appropriate homographies. Adding synthetic camera motion to an AutoLoop output video may improve the ability to mask objectionable ghosting artifacts and potentially reduce stabilization warping artifacts by creating a smoothed version of the AutoLoop output video. Typically, implementing synthetic camera motion may require less warping than implementing tripod stabilization.

Once the AutoLoop core engine 125 determines the loop parameters, a postgate engine 126 may determine whether an AutoLoop output video based on the loop parameters produces a relatively high quality video loop. Although an AutoLoop core engine 125 may generate loop parameters that produce an AutoLoop output video that properly closes and loops, the AutoLoop output video may not contain enough motion for a user to detect or be of interest to a user. For example, the AutoLoop output video generated from the AutoLoop core engine 125 may contain mostly a static sequence with little movement in the video loop. To determine the quality of the AutoLoop output video, the postgate engine 126 may analyze one or more dynamism parameters for each pixel in the AutoLoop output video. If the postgate engine 126 determines that based on the dynamism parameters the AutoLoop output video is a relatively low quality AutoLoop and/or not a relatively high quality AutoLoop, the postgate engine 126 may automatically discard and reject the AutoLoop output video, notify a user of discarding or rejection the AutoLoop output video and/or prompt a user that the AutoLoop output video does not meet a quality threshold and inquire whether the user chooses to discard the AutoLoop output video.

The postgate engine 126 may determine the relative quality of the AutoLoop output video by analyzing dynamism parameters that are based on variability and dynamic range for each pixel of the AutoLoop output video. In one or more embodiments, the postgate engine 126 may analyze the variability and the dynamic range based on luminance and/or color intensity for each pixel. If the dynamism parameters exceed one or more postgate thresholds, then the postgate engine 126 may determine that the AutoLoop output video produces a relatively high quality video loop. The postgate thresholds may be configured to account for the intensity values for each pixel and/or the size of one or more continuous regions of pixels with the related intensity values. For example, the post gate engine 126 may determine that an AutoLoop output video satisfies the postgate thresholds when the AutoLoop output video includes a relatively small continuous region with relatively high intensity or having a relatively large continuous region with relatively low intensity.

Export and playback engine 130 may be coupled to the postgate engine 126 and configured to create a playback version of the AutoLoop output video based on operations of the AutoLoop core engine 125. In embodiments where the AutoLoop core engine 125 creates the AutoLoop output video using consensus AutoLoop operations, the export and playback engine 130 may be configured to create the AutoLoop output video as a short video and played back in a loop, or as an animated Graphics Interchange Format (GIF) or Portable Network Graphics (PNG) files. For a per-pixel based AutoLoop output video, the export and playback engine 130 may be configured to save the AutoLoop output video in a format for export to a custom player for playing the video and apply various effects, such as blending.

Figure 2:
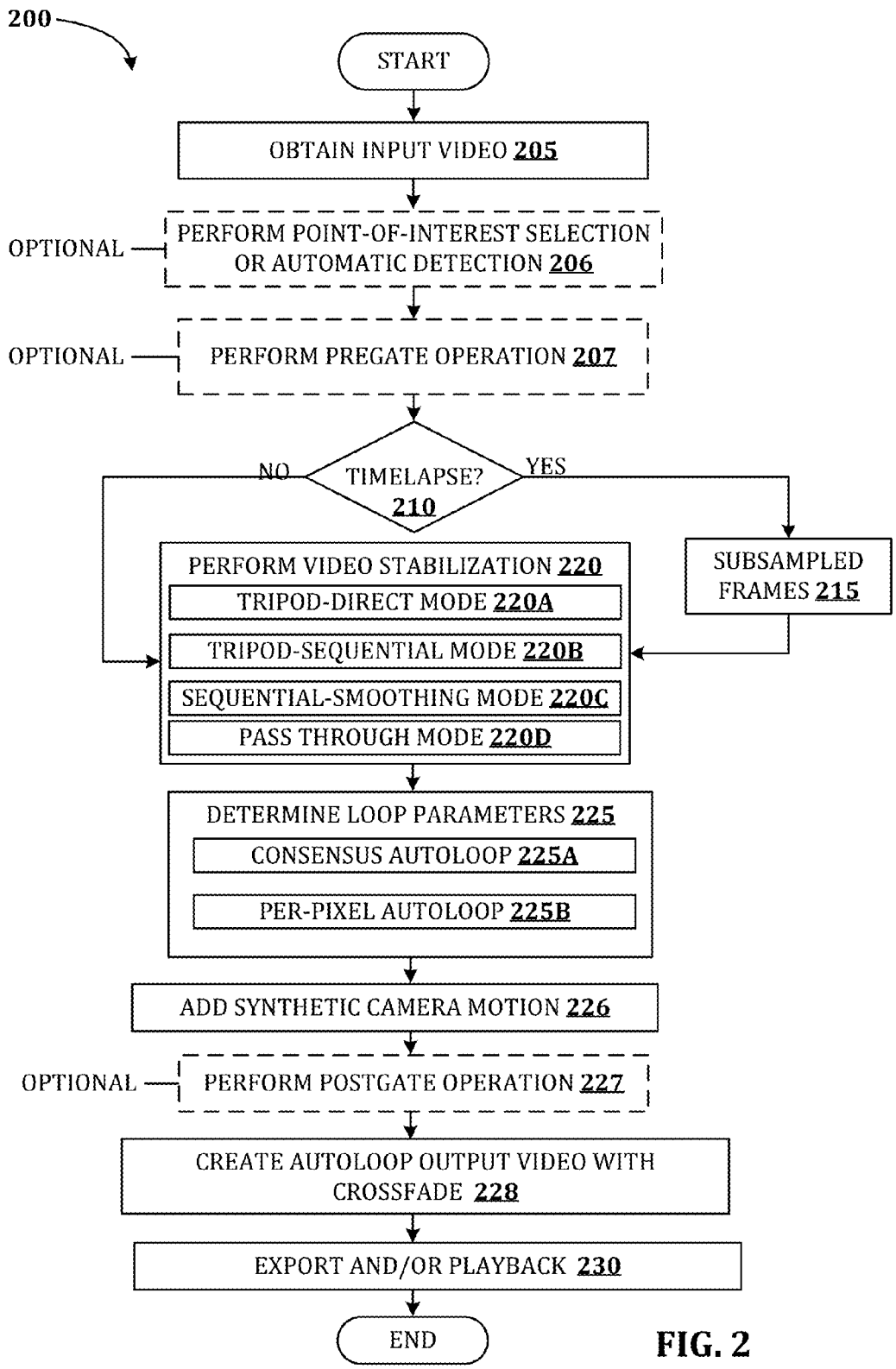
FIG. 2 depicts a flowchart illustrating a method for an AutoLoop pipeline in accordance with one embodiment.

FIG. 2 is flowchart of an embodiment of an operation 200 that depicts an AutoLoop pipeline for creating an AutoLoop output video. In one embodiment, operation 200 may be implemented within electronic device 105 as illustrated in FIG. 1. With continued reference to FIG. 1, operation 200 begins when electronic device 105 obtains an input video and/or multiple images (e.g., a series and/or sequence of images), collectively referred to as an "input video" at step 205. In embodiments, an input video may be captured, for example, by camera 110 or may be received by electronic device 105 from an external device 150 over a network. The input video can include short burst video clips of about 1 to 5 seconds, longer video clips from about 6 seconds to 60 seconds or more, burst sequences, frame sequences, slow motion video clips, or time-lapse videos. The input video can includes values at pixels over a time range and can be denoted as a three-dimensional volume (3D) volume V(x, t) with a two-dimensional (2D) pixel location x,y and frame time t. The 2D pixel location may also be referred to herein as pixel x.

Next, operation 200 may move to optional step 206 and perform point-of-interest selection or automatic detection. Using FIG. 1 as an example, the pregate and preprocessing engine 116 may perform optional step 206. Operation 200 may perform optional step 206 when operation 200 determines that the input video is too long to pass directly through the AutoLoop pipeline. To determine whether an input video is too long, operation 200 may include one or more trimming thresholds indicative of when an input video is categorized as being too long. For example, if the length of the input video exceeds at least one of the trimming thresholds, operation 200 may determine the input video is too long to process for the AutoLoop pipeline. Operation 200 typically implements optional step 206 when the input videos is more than several seconds long (e.g., more than 6 seconds long). Once operation 200 determines that the input video is too long, operation 200 may trim down the input video.

To trim down the input video, operation 200 may manually identify one or more points-of-interest within the input video. Based on the identified points-of-interest, operation 200 may trim out a portion of the input video that contains the points-of-interest. In embodiments where operation 200 obtains the points-of-interest manually, a user may provide input data indicating the points-of-interest. For instance, a user may manually indicate the points-of-interest within the obtained input video with one or more input interface devices. Using FIG. 1 as an example, the electronic device 105 may include one or more input interface devices, such as keyboard, mouse, one or more buttons, and/or touchscreen that receives input data from a user that indicates the points-of-interest for an input video.

In another embodiment, operation 200 may automatically identify a point-of-interest using one or more image features associated with the clip, such as dynamism, optical flow analysis, face or human detection, motion tracking, and various other saliency measure. Additionally or alternatively, operation 200 may automatically identify a point-of-interest and/or a portion of video that includes the point-of-interest by performing stabilization trimming. Stabilization trimming selects one or more sub-segments that can be stabilized within the input video by performing a stabilization analysis of at least a portion of the input video. The stabilization analysis identifies images that are capable of being stabilized using one of the stabilization operations (e.g., a tripod-mode stabilization operation) and/or images with too much camera motion that exceed one or more motion thresholds. Portions of the input video that can be stabilized may be identified as video portions that include the point-of-interest while images with too much motion may be trimmed off.

After completing optional step 206, operation 200 may then move to optional step 207 and perform pregate operations. In FIG. 1, the pregate and preprocessing engine 116 may perform optional step 207. Operation 200 may bypass and not perform optional step 207 in situations where a user has manually requested and/or identified a point-of-interest and/or a portion of the input video to generate an AutoLoop output video. In instances where operation 200 does not receive a user request to generate an AutoLoop output video, operation 200 move to optional step 207 to automatically determine whether the content of the input video are suitable for creating an AutoLoop output video. Operation 200 may implement a pass and/or fail decision and/or assign one or more pregate scores using one or more image features. Examples of implementing operation 200 may include a rule-based pregate classifier, such as a support vector machine (SVM), regression or regularized regression classifier, multilayer perceptron, and/or other classifier operation that are similar and trained from labeled data. If the pregate score exceeds one more pregate threshold values, operation 200 may determine that the given input video is compatible with creating an AutoLoop output video.

At optional step 207, operation 200 may analyze one or more image features for one or more frames within an input video to score the compatibility of generating an AutoLoop output video using the input video. Operation 200 may analyze image features and produce pregate scores using one or more detectors and/or classifiers that include, but are not limited to a junk detector, a face detector, a scene classifier, and/or motion features. The junk detector may identify a variety objects within one or more images that typically do not produce relatively high quality AutoLoop output videos. A face detector identifies one or more faces in an image and/or provide bounding boxes and other data related to face recognition. Generally, images that contain faces are less likely to produce relatively high quality AutoLoop output videos and/or may require different loop optimization approaches, such as increasing the minimum loop period and reducing the crossfade length. Scene classifiers may label images as containing particular objects or belonging to particular scene categories. The scene categories may include, but are not limited to, outdoor and/or indoor environments, such as a beach, concert, waterfall, river, kitchen, and/or restaurants. In one embodiment, the scene classifier may be a raw scene classifier configured to analyze raw scene image representation that provide a lower-level raw image representation. The motion features may include a variety of motion data, such as motion data obtained from one or more sensors (e.g., a gyroscope). Motion data, such as optical flow magnitude, may also be used in determining whether to create an AutoLoop output video.

Next, operation 200 may determine whether to implement a timelapse conversion for all or part of the input video at step 210. Operation 200 may determine to implement a timelapse conversion based on a variety of conditions that include but are not limited to when the input video is still too long after the trimming and point-of-interest selection process (e.g., more than 6 seconds long) and/or the scene content within the input video. In embodiments where operation 200 performs timelapse conversion operations after performing video stabilization, operation 200 may consider whether to perform a timelapse conversion based on operation 200's ability to stabilize the input video using tripod-mode stabilization operations. If operation 200 determines to implement a timelapse conversion, operation 200 may move to step 215. Alternatively, if operation 200 determines not to implement a timelapse conversion, operation 200 may move to step 220. To perform a timelapse, operation 200 may move to step 215 and subsample the frames and subsequently play the frames at a higher frame rate. For example, operation 200 may initially have about a 60 second video at 30 frames per second (fps). To generate about a 5 second AutoLoop, operation 200 may compress the input video using a necessary factor of about 12 by subsampling frames from the input vide at 2.5 fps to get 150 frames in about 60 seconds. Afterwards, operation 200 may play the subsampled frames at 30 fps to get a 5 second time lapse.

At step 220, operation 200 may perform video stabilization on the frames in the input video using one or more video stabilization operations. With reference to FIG. 1, the stabilization engine 120 may perform step 220 of operation 200. Generating an AutoLoop output video typically involves stable input videos with minimal drift since the loop and crossfade aspects of the AutoLoop output video force direct visual comparisons between formerly temporally distant frames. If these frames have become dissimilar due to stabilization drift, comparing or blending them in the AutoLoop output video may cause visually jarring artifacts like temporal glitches or ghosting. Operation 200 may perform video stabilization at step 220 to stabilize the input video to look as though it had been shot using a tripod or shot with a smooth camera trajectory. The benefits of video stabilization include reducing or eliminating stabilization drift within the frames, which reduces artifacts in the AutoLoop output video, such as temporal glitches or ghosting.

In order to create a closed loop of video without a perceived seam or jump at the closure point, the content of the video is identically positioned across the loop closure. Most consumer videos are shot without the use of a tripod or other stabilization hardware, which typically results in video with camera shake and drift despite a user's attempts to keep the camera motionless. Camera shake and drift can create difficulty in finding candidate frames for loop closure points, as it may be unlikely that there will be two suitable frames or series of frames in which the content's position within the frame matches precisely, even if the subject of the video is motionless within the scene. Operation 200 may perform video stabilization of the raw input video to simplify the process of finding smooth loop closures and preserving motionless content as static as possible within the frame.

Operation 200 may implement a cascade of stabilization operations to stabilize the input video received from step 205 or after performing preprocessing and pregate operations at steps 206, 207, and 210. As shown in FIG. 2, operation 200 may attempt to stabilize the input video by initially implementing tripod-mode stabilization operations, such as a tripod-direct mode stabilization operation at step 220A or a tripod-sequential mode stabilization operation at step 220B. Other stabilization operations may also be used to stabilize the input sequence if none of the tripod-mode stabilization operations are successful in stabilizing the video. In FIG. 2, operation 200 may attempt to perform sequential-smoothing mode stabilization at step 220C if both the tripod-direct mode stabilization operation at step 220A and the tripod-sequential mode stabilization operation at step 220B fail. If sequential-smoothing mode stabilization fails, then operation 200 may not perform any stabilization operation using the pass through mode at step 220D. Operation 200 may use a variety of stabilization metrics to determine whether each form of stabilization succeeds including detecting and matching features between frames, feature match confidences, area occupied by matchable features, corner travel distance, corner angle deflection, and/or crop dimensions.

When performing stabilization operations, operation 200 may detect feature points in video frames of the input video. Feature points can include corners of objects that may be determined for each frame in the input video. For example, a reference frame may be selected from the input video frames (generally, but not necessarily, the middle frame) and operation 200 may determine one or more feature points in the reference frame. Operation 200 may also determine feature points across the video frames and the feature points may be matched across video frames to determine aligned features. Further, operation 200 may selectively align similar features across video frames. Operation 200 may determine a transformation to map the features from the frames in the input video. Once the transformation is found, the frame can be warped accordingly (warp the coordinates of the remaining frames to the reference frame), so that it is aligned with the reference frame. In some embodiments, based on the above transformation, a hardware-based warping mechanism may be used to transform the frame(s) onto the reference frame's coordinates. All other frames may be warped to match the coordinate system of the reference frame to create a stabilized input video.

Figure 3A:
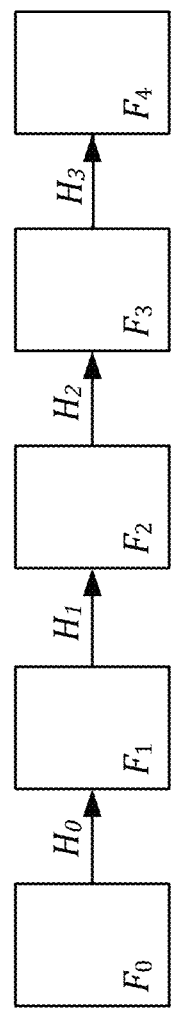
FIG. 3A illustrates a method for using tripod-sequential mode stabilization of frames of an input video during video stabilization in accordance with one embodiment.
Figure 3B:
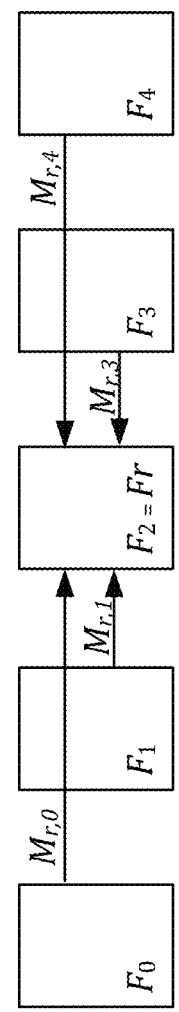
FIG. 3B illustrates a method for using tripod-direct mode stabilization of frames of an input video during video stabilization in accordance with one embodiment.

In an embodiment, at step 220A, a tripod-direct mode stabilization operation may be applied to the input video. As shown in FIG. 3B, in tripod-direct video stabilization operation, frames of the input video may be matched directly to a single reference frame. After matching, a single correction homography may be found for each frame to map it directly to the reference frame. In tripod-direct mode operation, image features are initially detected in the reference frame $F_r$, which can typically be the temporal midpoint of the video sequence to reduce the maximum temporal distance between frames and the reference frame. Selecting the reference frame $F_r$ as the temporal midpoint helps to increase similarity between frames and the reference frame $F_r$; and thus, increase opportunities for feature matching. Then for each frame $F_i$ in the input video sequence, feature matching may be performed between $F_i$ and $F_r$, and a weighted random sample consensus (RANSAC) method analysis may be used to directly generate the correction homography matrix $M_{r,i}$ to map the content of frame $F_i$ to $F_r$. Other analysis methods similar to RANSAC may also be used in other embodiments. A history of all matched features, including a history inlier/outlier status and reprojection error may be determined and stored. These feature histories can be used in the weighted RANSAC stage to ensure that tracking of content material in the video is consistent.

In tripod-direct stabilization formulation, equation 1 may be replaced with the correction homography matrix $M_{r,i}$ that maps frame $F_i$ directly to the reference frame $F_r$, as shown in equation 1:

$$F_r = M_{r,i} F_i \qquad (1)$$

By performing a reprojection of each frame $F_i$ in the sequence by its corresponding correction matrix $M_{r,i}$, a stabilized video clip can be produced where the still content appears motionless. While there may be some motion artifacts and errors such as, parallax, non-planar motion, and feature location and reprojection errors, operation 200 may eliminate or reduce drift introduced by the cumulative effect of these errors in the tripod-sequential implementation. The reduction or elimination of drift ensures that most static content features essentially stay at a fixed pixel position throughout the stabilized clip. This allows for any two pairs of frames to be candidate loop closures for the static (i.e., stationary background) regions of the frame; thereby, greatly increasing the ability to find potential smooth loop closures throughout the input video.

In another embodiment, at step 220B, a tripod-sequential mode stabilization operation may be applied to the input video, which compares content between consecutive frames. Tripod-sequential mode stabilization operation may be configured to eliminate camera motion from the content by performing motion analysis between consecutive frames, and then mapping the frames back to a single reference frame (e.g., typically the middle frame) by chaining the homographies between intervening frames. For example, in the analysis phase, as shown in FIG. 3A, for each adjacent pair of frames $F_n$, $F_{n+1}$ in the video clip, a homography $H_n$ maps the planar motion of the content of frame $F_n$ to $F_{n+1}$. The correction matrix $M_{j,k}$ that maps frame $F_k$ to $F_j$ (i.e., $F_j = M_{j,k} F_k$) is then given by equation 2:

$$M_{j,k} = \prod_{i=j}^{k-1} (H_i)^{-1} \qquad (2)$$

Where j<k.

If, for example, frame 0 is chosen as the reference frame, then by re-projecting each video frame $F_i$ in the sequence by the correction matrix $M_{0,i}$, a new video sequence can be produced where the motion of the tracked content is removed. As the analysis stage of the video only compares consecutive frames for relative motion, there may be a slight drift from frame to frame because of many factors, including error in accuracy of feature detection, margin of error in inlier detection of features, and non-planar motion of content. This drift may be typically imperceptible or inoffensive when viewing the resulting stabilized video, but a comparison of temporally distant frames will often show significant accumulated differences in the framing and reprojection of the video's content because of this drift. Thus, content within the video that is perceived as being static and motionless will in fact exhibit different pixel position within the frame over time, making smooth loop closure difficult, even for perceptually static elements.

With certain input videos, such as panning videos, operation 200 may find difficult to stabilize the input video using tripod-mode stabilization operations even though the video content may lend itself to creating a video loop. For example, a panning video of a person riding a bicycle in front of a featureless background may be a candidate for a video loop although performing tripod-mode stabilization operations may be difficult. In such cases, operation 200 may perform tripod-mode video stabilization operations on the input video and subsequently detect that tripod-mode stabilization has failed. When failure occurs, operation 200 may fall back to smoothing the input video path, such as performing sequential-smoothing mode stabilization operations shown in step 220C, to generate a stabilized video whose trajectory is similar to that of the input video (panning, for example), but with the high-frequency camera shake removed.

In addition, in embodiments, operation 200 may report to the user that stabilization of the input video using any of the stabilization operations in step 220 are not possible. Videos that cannot be stabilized include video with severe shake and/or panning, or videos where there are no detectible features in the content, for example, running water or clouds. Video input content that include no detectable features, such running water or clouds, may still be used to create an AutoLoop output video without stabilization. Content with these type of features are often forgiving for looping purposes even without stabilization because there are no features to mismatch and crossfading may smooth the temporal discontinuity without causing much ghosting.

At step 220, operation 200 may also be able to improve stabilization by dropping frames with too much shaking or motion at the beginning or end of the input video. For example, for a given input video, the initial frames may suffer from severe shaking or movement initially, but subsequently become fairly still. Having operation 200 drop the initial bad frames allows operation 200 to stabilize the input video using one of the stabilization operations, such as a the tripod-sequential mode stabilization operation. Not dropping the initial bad frames could prevent operation 200 in stabilizing the input video. Stabilization success metrics, such as quality of matched features, corner behavior, and crop dimensions may be used to determine how many frames to drop from the beginning and end of the input video.

After performing video stabilization, operation 200 may then move to step 225 and determine loop parameters. In FIG. 1, the AutoLoop core engine 125 may perform step 225 of FIG. 2. In an example, operation 200 may index the frames in the input video from 1 to N in order to determine a starting frame 's', a loop period 'p' and crossfade length, 'w', using one or more AutoLoop operations. Loop parameters may be determined using a consensus AutoLoop operation or a per-pixel AutoLoop operation.

In one embodiment, operation 200 may use the consensus AutoLoop operation in step 225A to determine loop parameters. The consensus AutoLoop operation may minimize a temporal energy function to select the starting frame s, and loop period (in frames) p, to create an AutoLoop output video, with a temporal cross-fade added to smooth any remaining temporal discontinuity. For the consensus AutoLoop operation, loop playback options include a short video from the selected frames with an appropriate crossfade in an embodiment and played back in a loop, or created as an animated GIF or PNG file. The consensus AutoLoop operation may be simple, robust, and computational efficient.

For the consensus AutoLoop output video operation, a starting frame, s and loop period (in frames) p, may be selected from the stabilized video to create an AutoLoop output video by looping frames s through s+p−1 of the stabilized video, as shown in FIG. 4A. That is, if V(t) denotes frame 't' of the input video, for 0≤t<N (where N is the number of frames), then the output video loop is given by V in equation 3, where $$\tilde{V}(s+t)=V(s+\mathrm{mod}(t,p)), \text{ for all } -s \leq t < \infty \quad (3)$$

For notational convenience, let $\phi_p(t)=\mathrm{mod}(t,p)$, so equation 3 becomes:

$$\tilde{V}(s+t)=V(s+\phi p(t))$$

Hence, $\tilde{V}(s+t)=V(s+t)$ for $0 \leq t < p$, and $V(t+\xi p)=\tilde{V}(t)$ for integers $\xi$ (with $0 \leq t+p \leq N$). $\tilde{V}$ simply picks out frames s through s+p−1 of the input V and plays them in a loop. In this formulation, $\tilde{V}$ starts with frame s+mod(−s, p) of the input, rather than frame s.

Additionally, the consensus AutoLoop output video operation may require that $0 \leq s < N$, $1 < p_{min} \leq p \leq N$, and s+p<N. In one embodiment, the period p may be greater than one frame since p=1 corresponds to a static scene and short loops often look jerky and repetitive. One second may be the minimum loop length that consistently produces a relatively high quality video loop over a wide range of content, so setting a lower bound $p_{min}$ equal to about one second gives a loop that is at least one second long, that is, $p_{min}=1.0\times$ frame rate (e.g., $p_{min}=30$ for a 30 fps video).

Based on these constraints, operation 200 may select a start time s and period p to create a loop for the video that represents a loop with minimal temporal discontinuity in the transition from the end of one loop to the beginning of the next, (i.e., the transition from frame V(s+p−1)→V(s)). For a smooth and natural-looking transition, this may be as similar as possible to the transition from V(s+p−1)→V (s+p) in the input video. Therefore, s and p may be chosen such that V(s)≈V(s+p), so that V (s+p−1)→V(s) looks similar to V (s+p−1)→V(s+p). This represents the minimization problem for an energy function shown in equation 4.

$$\min_{s,p} E_t(s,p)=\|V(s)-V(s+p)\| \quad (4)$$

where $\|V(t_1)-V(t_2)\|=\Sigma_x\|V(t_{1,x})-V(t_{2,x})\|$
V(t,x) denotes pixel x at frame t, represented as a vector with one entry for each color channel (e.g., Y, Cb, and Cr for YCbCr color representation and R, G and B for RGB color representation). The pixel difference, $\|V(t_{1,x})-V(t_{2,x})\|$, may include perceptual channel weights, for example, for YCbCr, the Y plane may be weighted more heavily that the CbCr plane since it is more perceptually significant. In other words, as shown in equation 4, minimization of the energy function is based on the difference of pixels, where each pixel has different color channels that could be weighted differently. Operation 200 obtains a sum over of the perceptual pixel difference for all of the pixels between two frames, $t_1$ and $t_2$. By doing so, operation 200 is able to obtain a perceptual measure between the two frames, $t_1$ and $t_2$. For a symmetric formulation, the energy function could also encourage V(s−1)≈V(s+p−1) so that V(s+p−1)→V(s) looks similar to V(s−1)→V(s), as well as to V(s+p−1)→V (s+p). The energy function, as shown in equation 5 would then become:

$$E_t(s,p)=\tfrac{1}{2}\|V(s)-V(s+p)\|^2+\tfrac{1}{2}\|V(s-1)-V(s+p-1)\|^2 \quad (5)$$

In an embodiment, the consensus AutoLoop operation may include a crossfade and optimize loop parameters with respect to the crossfade. Even minimal temporal discontinuity in AutoLoop output videos can be perceptible in output videos without a crossfade and appear as a jarring temporal 'glitch' during playback as shown in FIG. 4A. The minimization of energy function in equation 4 compares frames s and s+p and ignores the frames that follow, even if the input video diverges dramatically from the loop shortly after the loop restarts. For example, in an input video that includes a pendulum swinging back and forth, a loop with the pendulum weight at the same location but moving in opposite directions at frames s when compared to s+p would receive a low energy function. As a result, frames at s+t and s+p+t would rapidly diverge when t is greater than zero.

To mitigate temporal discontinuity, a temporal crossfade may be performed to gradually fade the beginning of the loop into the frames that follow it, as shown in FIG. 4B. Crossfade may determine one or more frames after the loop period. These post-loop frames may be used to blend with frames at the beginning of the loop. Crossfade is a common cinematic technique to account for discontinuity in a loop, but it can cause ghosting, when rigid objects fade in and out. However, viewers may typically be accustomed to this kind of artifact, is less visually objectionable than a temporal glitch shown in FIG. 4A. In addition to masking technical imperfections, crossfading can also often add an artistic effect to video loops.

Given a crossfade length 'w', with 0≤w≤p, an output loop with fade may be defined by equation 6:

$$\tilde{V}(s+t) = \begin{cases} \alpha_{\varphi_p(t)} V(s+\varphi_p(t)) + \\ (1-\alpha_{\varphi_p(t)})V(s+p+\varphi_p(t)), & \text{for } 0 \leq \varphi_p(t) < w \\ V(s+\varphi_p(t)), & \text{for } w \leq \varphi_p(t) < p \end{cases} \quad (6)$$

The crossfade is asymmetric and may be built with frames following the loop rather than preceding the loop. By doing so, operation 200 is able to select any s≥0 since the fade buffer is at the end of the video. For a linear fade, the weight 'α' is given by equation 7:

$$\alpha_t = \frac{t+1}{w+1}, \text{ for } 0 \leq t < w \quad (7)$$

That is, for 0≤t<w:

$$\tilde{V}(s+t) = \alpha_t V(s+t) + (1-\alpha_t)V(s+p+t), \text{ with } \alpha_t = \frac{t+1}{w+1} \quad (8)$$

Note that with w=0, equation 8 reduces to looping without crossfade as shown below in equation 9:

$$\tilde{V}(s+t)=V(s+\varphi_p(t)), \text{ for } 0 \leq \varphi_p(t)<p, \quad (9)$$

For w=p, equation 9 becomes equation 10 as shown below:

$$\tilde{V}(s+t)=\alpha_{\varphi_p(t)} V(s+\varphi_p(t))+(1-\alpha_{\varphi_p(t)})V(s+p+\varphi_p(t)),$$
$$\alpha=(t+1)/(p+1) \quad (10)$$

To account for the crossfade, a temporal energy function may penalize the difference between the crossfaded loop and the corresponding segment of the input video. For nontrivial fades, i.e. w>0, the minimization problem may be defined in equation 11 as:

$$\min_{s,p} E_t(s,p,w) = \Sigma_{t=0}^{w-1} \Psi_t, \text{ or } 0 < w \leq p \quad (11)$$

where $\Psi_t = \|\tilde{V}(s+t) - V(s+t)\|^2$

The temporal energy function simplifies to equation (12):

$$E_t(s,p,w) = \Sigma_{t=0}^{w-1} \Psi_t = \Sigma_{t=0}^{w-1} \|\tilde{V}(s+t) - V(s+t)\|^2 = \Sigma_{t=0}^{w-1} (1-\alpha_t)^2 \Delta V_{s,p}(t), \Delta V_{s,p}(t) = \|V(s+t) - V(s+t) - V(s+p+t)\|^2 \quad (12)$$

The energy formulation above reduces the weight on the frame difference proportional to the position in the fade, but this sometimes insufficiently penalizes ghosting artifacts occurring near the end of the fade, which can be just as noticeable even though they are faint. Equation 13 is an alternative to the above temporal energy function that has uniform weights:

$$E_t^{uniform}(s,p,w) = E_{t=0}^{w-1} \|V(s+t) - V(s+p+t)\|, \text{ for } 0 \leq w \leq p, = \Sigma_{t=0}^{w-1} \Delta V_{s,p}(t) \quad (13)$$

This penalizes the difference between the fade inputs equally for the entire duration of the fade. Equation 13 can help reduce ghosting in situations where ghosting occurs toward the end of the fade, where there is significant divergence between V (s+t) and V (s+p+t) for t close to w, but is not heavily penalized since the a value is relatively small.

In another embodiment, operation 200 can refine the frame difference measures used in the temporal energy function in several ways by weighting the individual pixels proportional to their impact on the perceptual quality loop. Equation 14 provided below implement the pixel difference weighting:

$$\|V(t_1) - V(t_2)\|^2 = \Sigma_{x \in V} \gamma(x, t_1:t_2) \|V(t_1,x) - V(t_2,x)\| \quad (14)$$

Where $\gamma(x, t_1:t_2)$ weights pixel x and can potentially depend on the frame range $t_1:t_2$. Operation 200 may let the weight y depend inversely on the temporal variability of the pixel and possibly the variance of the differenced signal since loop closure differences may be less noticeable for pixels that are highly variable within the loop. Operation 200 may also let y depend inversely on the spatial variability in a neighborhood of the pixel, since loop closure discrepancies might also be masked by high spatial variability. Finally, the presence or absence of edges (e.g. run Harris corner/edge detector to generate edge map) could inform the pixel weight. Down weighting pixels on or near edges may also be appropriate, since minor stabilization errors can cause edges to move very slightly, which creates very large differences in the pixels near the edge. Adding appropriate pixel weights could help normalize the energy function across different content classes (e.g., videos with relatively little motions versus highly dynamic videos).The pixel weighting operation could also be relevant for designing metrics to help determine whether anything is happening in a particular portion of the input video.

For the consensus AutoLoop operation the fade length, either fixed or variable, may be determined after optimizing the loop period p. Any fixed fade length, w, may be chosen with 0≤w≤min(p, N−p−s−1) to ensure that enough frames remain after the loop to form the fade. At the extremes, w=0 means no fade, and w=p means all frames of the loop will be crossfaded. In an embodiment, a fixed fade length of approximately one second may be set, as this length may be long enough to smooth the temporal discontinuity and add an appealing effect. Additionally, a fixed fade length of approximately one second may be less than or equal to the minimum allowed p so that w<=p is always satisfied and short enough that reserving fade buffer frames at the end of the loop do not limit the available s and p too much. A long crossfade may generate an AutoLoop output video with a signature look and feel.

A fade width may also be selected that varies depending on the video content. This may be desirable, since too long a crossfade may cause ghosting for certain content, while some loops may have a severe discontinuity at the loop closure that requires a longer crossfade to smooth. To optimize the fade width w for a given s, p, an energy function $E_{fade}$ may be used that models the content-dependent quality of different fade lengths and solves equation 15:

$$\min_w E_{fade}(s,p,w) \quad (15)$$

The energy function may capture the discrepancy between the crossfaded and input frames over the duration of the fade, as well as other characteristics of the input content that affect the perceptibility and desirability of ghosting artifacts. In an embodiment, $E_{fade}(s,p,w)$ may also be minimized over s, p, and w simultaneously. Operation 200 may also optimize a different fade width $w_x$ for each pixel x by solving equation 16:

$$\min_w E_{fade}(x,S,p,w) \quad (16)$$

A fade length that varies for each pixel may allow the fade to adapt to different types of content in different regions of a single video, to reduce ghosting in area where it is problematic, while achieving sufficient smoothing in other regions. After optimizing the fade length for each pixel, operation 200 may apply a Gaussian blur to the image formed by the fade lengths $w_x$ to smooth out the fades over all pixels. FIG. 2 also illustrates that operation 200 may determine loop parameters using per-pixel AutoLoop operations as shown in step 225B. The per-pixel AutoLoop operation may select a different start time and period (sx, px) for each pixel x for creating a temporally and spatially seamless loop, so that the resulting AutoLoop output video can contain many different loops in a single image, as well as static regions. Per-pixel AutoLoop operations may generate temporally smoother, more complex, and more interesting loops at a greater computational cost. The per-pixel AutoLoop operation may also discover lower temporal-energy loops, since different regions can choose different loops. For per-pixel-based AutoLoop output video, a custom player may be required to play different loops for each pixel, and potentially apply various effects like blending.

The temporal energy function may be further modified to encourage longer loops by attenuating based on the length of the loop period, with a multiplicative term of the form C/(C+p), where C is a constant. This, the energy attenuation may be rewritten as shown in equation 17.

$$\tilde{E}t(s,p,w) = (C/(C+p))E_t(s,p,w) = (C/(C+p)) \Sigma_{t=0}^{w-1} \gamma_t \Delta V_{s,p}(t) \quad (17)$$

The temporal energy function may also be modified to encourage more dynamic loops, for instance by dividing the loop energy by the average frame-to-frame temporal variability for loop, which is shown below in equation 18.

$$v(s,p) = 1/p \Sigma_s^{s+p-1} \|V_{t+1} - V_t\|^2$$

$$\tilde{E}_t(s,p,w) = 1/(v(s,p)) E_t(s,p,w) \quad (18)$$

In another embodiment, operation 200 may use the per-pixel AutoLoop operation in step 225B to determine loop parameters. A per-pixel AutoLoop operation selects a different start time and period $(s_x; p_x)$ for each pixel x, with the goal of creating a temporally and spatially seamless loop, so that the resulting AutoLoop can contain many different loops, as well as static regions. To implement per-pixel AutoLoop operations, the start time and period may be optimized according to equation 19.

$$E(s,p) = E_1(s,p) + \beta E_2(s,p) \quad (19)$$

Where E1(s, p)=$C_{static}1_{p=1}E_{static}+1_{p\neq 1}E_{temporal}$(s, p), and $E_2$(s, p)=$E_{spatial}$(s, p)
$E_{static}=\Sigma_{x|px=1} e_{static}(X)$
$E_{temporal(s,p)}=\Sigma_x e_t(x,s,p)\gamma_t(x)$
$E_{spatial(s,p)}=_{\|x-z\|}1/T\Sigma_{t=0}^T e_x(x,z,s_x,p_x,s_z,p_z)\gamma_s(x,z)$
Where, $E_{static}$ is the static energy, $E_{temporal}$ is the temporal energy, $E_{spatail}$ is the spatial energy. Static energy may be defined as the following in equation 20:

$$E_{static}=\Sigma_{x|px=1}e_{static}(X)$$

$$e_{static}(x)=\min\{staticCutoff,MAD\{g_{diff}(x)\})\}-static-Shift \quad (20)$$

$g_{diff}(x,t)=\|G(x, t+1)-G(x, t)\|$, where G is a spatiotemporal Gaussian blur operator. Median Absolute Deviation (MAD) is a $l_1$ analog of variance. Therefore, MAD$\{g_{diff}(x)\}$ measures the variability of the differenced values of a given pixel through time (after a spatiotemporal blur has been applied to entire video). $E_{static}$ relative to a limited range of frames may also be computed, by updating equation 20 with MAD$\{g_{diff}$ (x, t1: t2)$\}$.

Temporal energy is analogous to equation 11, which is the temporal energy to penalize the discrepancy between the crossfaded loop and input video; however, it is not defined on a per-pixel pixel basis. An optional attenuation term vt(x) may be included in the equation to generate equation 21.

$$E_{temporal(s,p)}=\Sigma_x e_t(x,s,p)\gamma_t(x)$$

$$e_t(x,s,p)=\Sigma_{t=0}^{Tw-1}\Psi_t$$

$$\Psi_t(x)=\|\tilde{V}(s+t,x)-V(s+t,x)\|^2 \quad (21)$$

Operation 200 may implement a two-stage approach for energy minimization via graph cut: Stage 1: For each candidate looping period p, optimize per-pixel start times $s_x/p$; Stage 2: Optimize per-pixel looping periods paired with optimal start times ($p_x$, $s_x/p_x$). Each stage may be formulated as a multilabel graph cut operation. An alpha-expansion operation using one or more graph construction known by persons of ordinary skill in the art may be implemented to minimize spatiotemporal energy functions in each stage of the algorithm. Alpha-expansion operations iteratively and approximately solves a multilabel minimization problem of the form by solving a sequence of binary graph cut problems, in which each variable can either keep its current label or adopt a new candidate label, α. Each binary graph cut problem can be solved by computing the minimum cut on a graph. In one embodiment, a Ford-Fulkerson style augmenting path operation may be used to compute the minimum cut on a binary graph. Other embodiments may use other types of graph cut solutions known by persons or ordinary skill in the art for energy minimization purposes.

Operation 200 may also perform a smooth up-sampling of the loop parameters when implementing per-pixel AutoLoop operations. The optimization may be performed on a down-sampled image and then the loop parameters may be smoothly up-sampled to apply to the full-resolution image. This can result in blocky up-sampling artifacts, which can be fixed by via Graph Cut or Gaussian blur. Multilabel graph cut may be used to find the optimal (s, p) label for each pixel in the upsampled image, from among the labels of its naively-upsampled neighbors. A Gaussian blur may be applied to the full-resolution 'images' of naively-upsampled s and p labels (represented in floating-point), then round each floating-point blurred s and p to the closest label belonging to one of its neighbors in the naively upsampled image.

Operation 200 may also perform segmentation on active and inactive regions when implementing per-pixel AutoLoop operations. Segmentation of the video into active (looping) and static (non-looping) regions before performing the loop parameter search can improve both performance and quality. The active-static segmentation can be formulated as a binary graph cut problem. The segmentation may allow freezing of the static pixels and loop parameter optimization may be performed only over active pixels which improves performance by decreasing the number of variables in the multilabel graph cut (i.e. pixels for which a nonstatic label maybe found). In addition, quality may be improved using consensus loop parameters and component content. For example, given an initial segmentation of the video into active vs. static pixels, the output frame may be divided into spatially disconnected components that encapsulate separate dynamic regions, which can operate independently in later stages of the algorithm. The consensus parameters may be separately searched for each segment, different treatments may be applied depending on component content (e.g. faces, objects), or each component may be evaluated individually a posteriori (and frozen it if needed).

In another embodiment, temporal crossfades and spatial blurs may be used to mask temporal and spatial glitches, respectively, in the output video. A per-pixel temporal crossfade of specified width (less than or equal to a pixel period), and spatial Gaussian blurs of a specified radius may be performed. A Laplacian pyramid-blending (multi-layer) may be used to hide spatial seams in an embodiment. Given N input images $I_0, \ldots, I_{N-1}\in R^{npixels}$ (linearized representations of 2D images) and a mask $M\in Z^{npixels}$ with M(x)∈$\{0, \ldots, N-1\}$ equal to the input image from which pixel x is drawn, it may be desired to generate a spatially blended version of the naive output image $\check{I}\in R^{npixels}$ defined by equation 22:

$$\check{I}(x)=I_{M(x)}(x) \quad (22)$$

Let I∈$R^{npixels}$ denote the final blended output image we wish to obtain by smoothing $\check{I}$ via Laplacian pyramid blending. Define masks $M_0, \ldots, M_{N-1}\in\{0, 1\}^{npixels}$ by equation 23:

$$M_n(x)=1\{M(x)=n\} \quad (23)$$

That is, each binary mask corresponds to a particular input image and indicates whether or not each pixel of $\check{I}$ is drawn from that input image.

Let $G_0, \ldots, G_{N-1}$ denote the (K+1)-level Gaussian pyramids of the binary masks $M_0, \ldots, M_{K+1}$, respectively. Let $G_n$(k, x) for 0≤n<N, 0≤k≤K, denote the value of pixel x in the k-th level of the nth pyramid (noting that the range of x depends on the pyramid level as each level is down sampled by a factor of 2 in each dimension). Let $L_0, \ldots, L_{N-1}$ denote the K-level Laplacian pyramids of the input images $I_0, \ldots, I_{N-1}$, respectively. Ln(k, x), 0≤n<N, 0≤k<K again denotes the value of pixel x in the kth level of the nth pyramid (and again, the range of x varies since the levels are down sampled). A K-level blended Laplacian pyramid $L \in R_{K \times npixels}$ may be built. The desired output $\tilde{I}$ can then be obtained by collapsing Laplacian pyramid $L$. Each level of $L$ may be generated as shown in equation 24:

$$L(k,x) = \sum_{n=0}^{N-1} G_n(k,x) L_n(k,x), k=0, \ldots, K-1. \tag{24}$$

Which has the properties: $L(0, \bullet) = \tilde{I}$, and $\sum_{n=0}^{N-1} G_n(k,x) = 1$, for all $0 \leq k \leq K$ and all $x$.

where $L(k, \bullet)$ is a weighted linear combination of the input Laplacian pyramids with weights summing to unity.

After determining the loop parameters in step 225, operation 200 may proceed to step 226 and add synthetic camera motion back into the AutoLoop output video. Adding synthetic camera motion back into the AutoLoop output video may not only create a more handheld-based video, but also improve the ability to mask objectionable ghosting artifacts and potentially reduce stabilization warping artifacts by creating a smoothed version of the AutoLoop output video. Once operation 200 determines the loop parameters for the AutoLoop output video, operation 200 may compute a smooth looping version of the input video for the frames that corresponds to the AutoLoop output video (e.g., frames s to s+p-1). In other words, the synthetic camera motion provides some amount of camera motion by smoothing out the camera trajectory of frames the input video that correspond to the AutoLoop output video (e.g., frames s to s+p-1). Afterwards, the synthetic camera motion may be added back into the AutoLoop output video by applying the appropriate homographies for the synthetic motion to the frames of the loop and crossfades.

Figure 5:
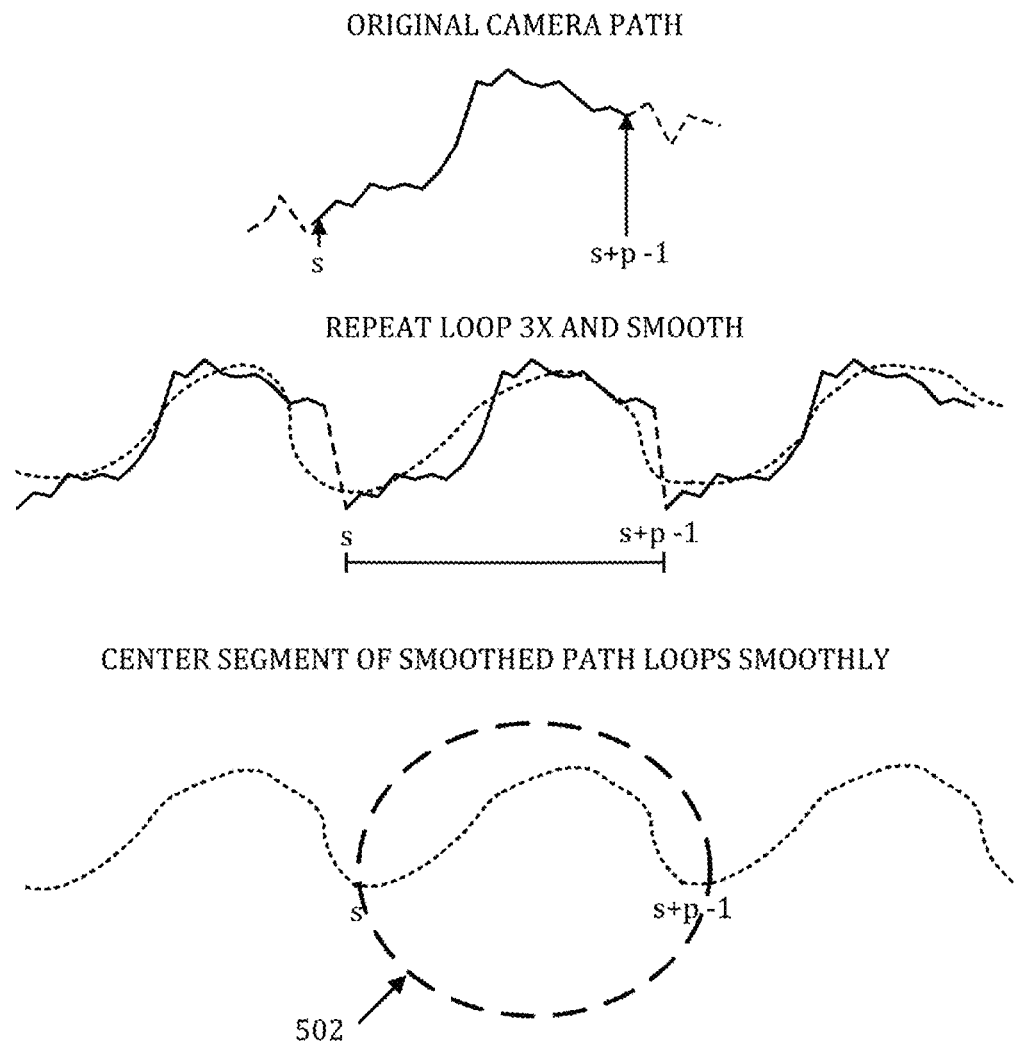
FIG. 5 illustrates a diagram used to smooth input video to produce synthetic camera motion in accordance with one embodiment.

FIG. 5 is an illustration of computing a synthetic camera motion based on the input video frames that match the AutoLoop frames determined in step 225. As shown in FIG. 5, the original camera path may include jagged and abrupt camera trajectories that could be caused from shaking and/or jerky camera movements within the input video. To compute the smooth looping synthetic camera motion using the original camera trajectories from the input video, the frames within the input video that correspond to the AutoLoop frames (e.g., frames s to s+p-1) may be repeated multiple times (e.g., at least three times). Operation 200 may then smooth out the camera trajectory with a Gaussian kernel, which may have a radius smaller than the loop period, and select a segment of the smooth path that corresponds to the center repetition of the loop. The center repetition loop is labeled as 502 within FIG. 5. By repeatedly looping the input video, smoothing out the camera trajectory, and choosing the center smoothed segment, operation 200 may ensure that the loop closes smoothly. Embodiments of the Gaussian kernel may be a fixed kernel radius or a kernel that adaptively varies its kernel width. When using a varying kernel width, the Gaussian kernel may be configured to use a wide kernel near the loop closure point to apply more smoothing and a narrower kernel away from the closure point. Other embodiments may vary kernel width based on the total amount of motion with the loop or based on random motion.

Operation 200 may then move to optional step 227 and perform postgate operations. Postgate operations may determine the relative quality of the AutoLoop output video by analyzing dynamism parameters that are based on variability and dynamic range for each pixel of the AutoLoop output video and/or parameters related pregate operations. In one or more embodiments, operation 200 may determine the variability and the dynamic range based on luminance and/or color intensity. Variability, which can be defined below using equation 25, represents the change of pixel intensity over time.

$$V(p_i) = \sqrt{\frac{\sum_t (d_i(t) - \bar{d}_i)^2}{T-1}} \tag{25}$$

$d_i(t) = p_i(t+1) - p_i(t)$

Where $p_i$ represents the pixel intensity (e.g., color or luminance) of a pixel i; t represents time, $d_i(t)$ represents the difference in pixel intensity between consecutive frames t and t+1; and T is the number of frames. Dynamic range, which can be defined below using equation 26, represents a maximum pixel intensity range over time for each pixel in the AutoLoop output video.

$$R(p_i) = \max_t (p_i(t)) - \min_t (p_i(t)) \tag{26}$$

Where $\max_t (p_i(t))$ represents a maximum pixel intensity and $\min_t (p_i(t))$ represents a minimum pixel intensity for a given pixel. Neighborhood dynamic range, which can be defined below using equation 27, represents a dynamic range for a continuous region for a frame.

$$R'(p_i) = \min_{p_j \in neighborhood \ (p_i)} \left( \max_t (p_i(t)) - \min_t (p_i(t)) \right) \tag{27}$$

Figure 6:
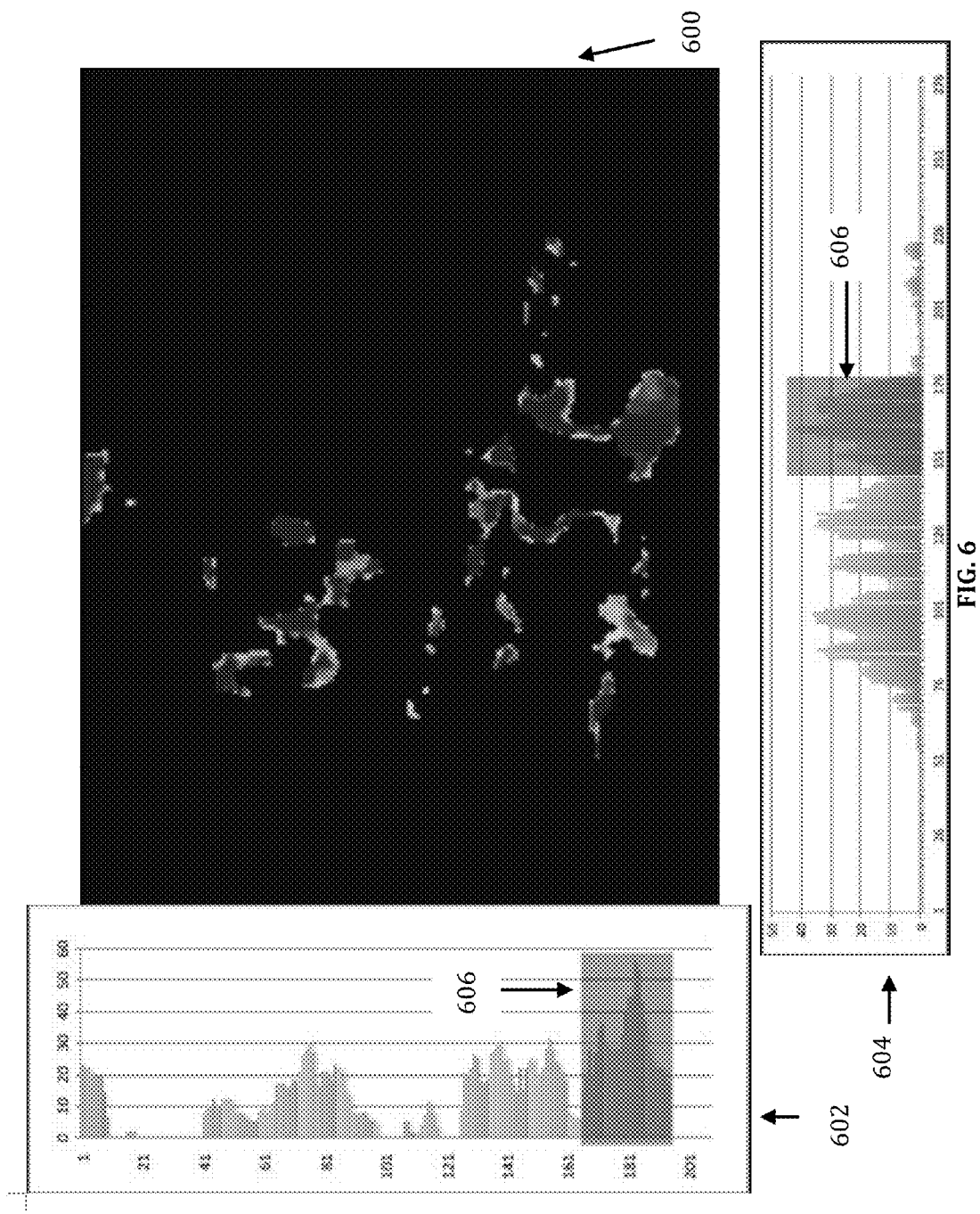
FIG. 6 illustrates a diagram used to perform postgate operations.

Operation 200 may use the variability and dynamic range for the pixels to compute one or more dynamism parameters and compare the dynamism parameters to one or more postgate threshold to determine whether the AutoLoop output video produces a relatively high quality video loop. The postgate thresholds may be configured to account for the intensity values for each pixel and the size of one or more continuous regions of pixels with the related intensity values. Operation 200 may then determine that an AutoLoop output video satisfies the postgate thresholds when the dynamism parameters, such an activity level threshold and area level threshold are above the postgate thresholds. Using FIG. 6 as an example, operation 200 may determine that an AutoLoop output video satisfies the postgate thresholds when the activity level threshold is above 40 pixel intensity units and the area level threshold of five percent. Image 600 corresponds to morphological closure that includes activity levels above 40. To determine whether the AutoLoop output video includes a continuous area above the activity level threshold, operation 200 may generate a row sums 602 and/or column sums 604 of pixel counts that are over the threshold. As shown in FIG. 6, based on the row sums 602 and column sums 604, the image includes an area 606 that includes at least 11 consecutive rows and column (i.e., more than 5% area level) somewhere in the image. Operation 200 when the AutoLoop output video includes a relatively small continuous region with relatively high intensity. Based on this postgate threshold, the AutoLoop output video would pass post gate operations. Operation 200 may also implement other post gate threshold that vary the activity level threshold and area level threshold.

After operation 200 finishes postgate operation 227, operation 200 may move to step 228 to create the AutoLoop output video with crossfade based on the loop parameters generated from step 225 and optionally the addition of synthetic camera motions at step 226. If operation 200 determines that based on the dynamism parameters the AutoLoop output video is a relatively low quality AutoLoop and/or not a relatively high quality AutoLoop, rather than moving to step 228, operation 200 may automatically discard and reject the AutoLoop output video, notify a user of discarding or rejection the AutoLoop output video and/or prompt a user that the AutoLoop output video does not meet a quality threshold and inquire whether the user chooses to discard the AutoLoop output video. Operation 200 may then move to step 230 to export and/or playback the AutoLoop output video. Export and/or playback of the AutoLoop output video may be based on the AutoLoop operation used to determine loop parameters. For example, AutoLoop output video created using consensus AutoLoop operations may be played back as a short video and/or an animated GIF or PNG file created using the start frames and loop period. For an AutoLoop output video created using per-pixel AutoLoop operations, a custom player may be required to play different loops for each pixel within the AutoLoop output video.

Although the FIG. 2 generally references an AutoLoop pipeline operation, persons of ordinary skill in the art would be aware that this disclosure is not limited to this particular pipeline. For instance, other embodiments may process one or more steps in parallel and/or modify the sequential order for implementing one or more steps. Using FIG. 2 as an example, operation 200 may implement steps 206 and 210 prior to performing pregate operation 207. Alternatively, operation 200 may perform all preprocessing and pregate operations after performing video stabilization at step 220. Moreover, operation 200 may add synthetic camera motion at step 226 after performing postgate operations 227. The use and discussion of FIG. 2 is only an example to facilitate ease of description and explanation.

Figure 7:
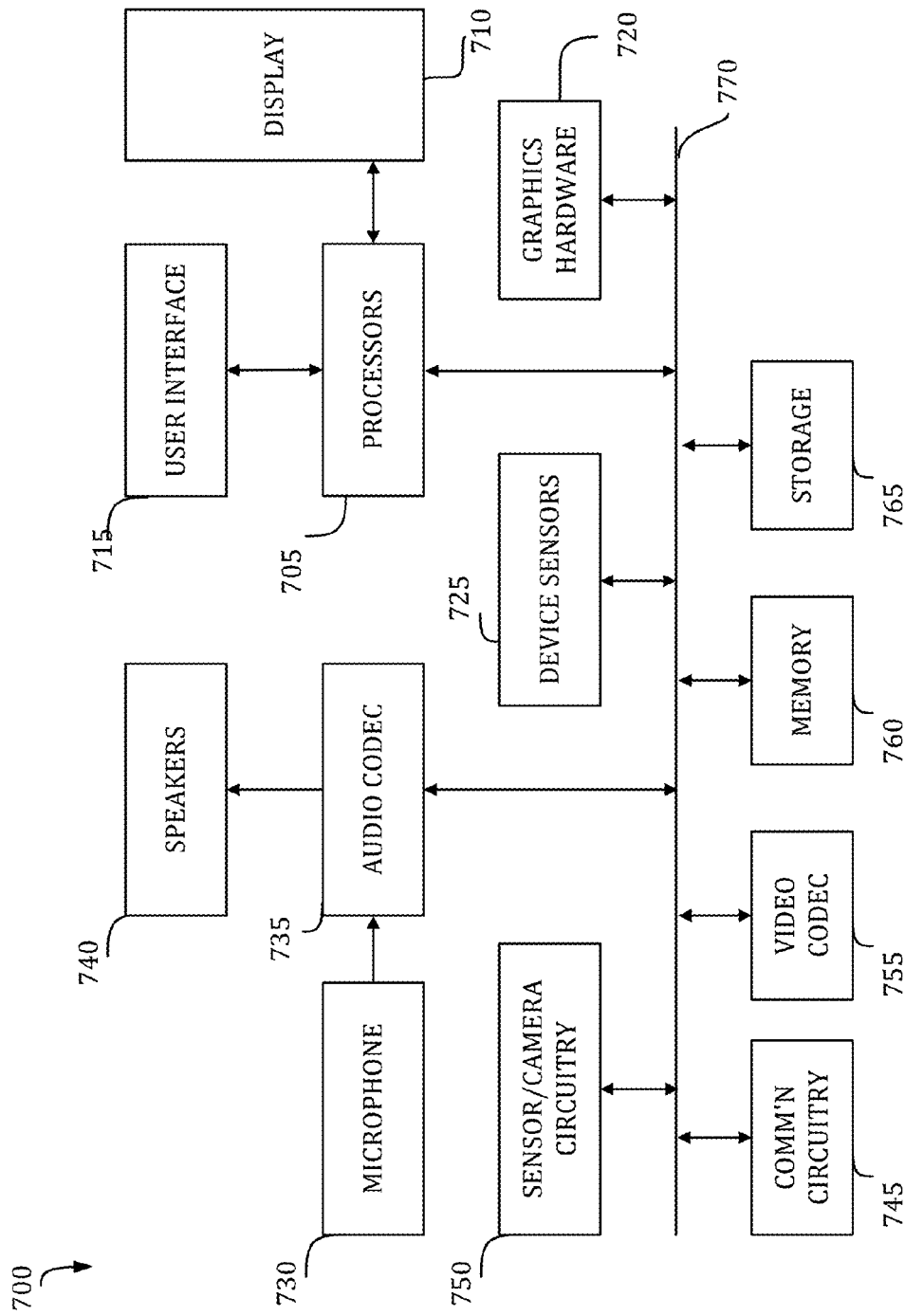
FIG. 7 illustrates a multi-functional device in accordance with one embodiment.

FIG. 7 is a simplified functional block diagram of an illustrative multi-functional electronic device 700, according to one embodiment. Electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture unit 750, video codec(s) 755, memory 760, storage 765, and communications bus 770. Electronic device 700 may be, for example, a personal digital assistant (PDA), personal music player, a mobile telephone, or a notebook, laptop or tablet computer system.

Processor 705 may execute instructions necessary to carry out or control the operation of many functions performed by device 700 (e.g., such as the generation and/or processing of time-lapse video in accordance with operation 200). Processor 705 may, for instance, drive display 710 and receive user input from user interface 715. User interface 715 can take a variety of forms, such as a button, keypad, dial, a click wheel, keyboard, display screen and/or a touch screen. Processor 705 may be a system-on-chip such as those found in mobile devices and include a dedicated graphics-processing unit (GPU). Processor 705 may represent multiple central processing units (CPUs) and may be based on reduced instruction-set computer (RISC) or complex instruction-set computer (CISC) architectures or any other suitable architecture and each may include one or more processing cores. Graphics hardware 720 may be special purpose computational hardware for processing graphics and/or assisting processor 705 process graphics information. In one embodiment, graphics hardware 720 may include one or more programmable graphics-processing unit (GPU), where each such unit has multiple cores.

Sensor and camera circuitry 750 may capture still and video images that may be processed to generate images in accordance with this disclosure. Sensor in sensor and camera circuitry 750 may capture raw image data as RGB data that is processed to generate an AutoLoop output video. Output from camera circuitry 750 may be processed, at least in part, by video codec(s) 755 and/or processor 705 and/or graphics hardware 720, and/or a dedicated image-processing unit incorporated within circuitry 750. Images so captured may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705 such computer program code may implement one or more of the methods described herein.

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). In addition, some of the described operations may have their individual steps performed in an order different from, or in conjunction with other steps, that presented herein. More generally, if there is hardware support some operations described in conjunction with FIG. 2 may be performed in parallel.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause one or more programmable control devices to:
obtain a plurality of input frames;
apply a stabilization operation to the input frames to generate a plurality of stabilized frames;
generate a video loop based on a plurality of loop parameters and at least a portion of the stabilized frames, wherein frames within the video loop correspond to a subset of the input frames;
generate a synthetic camera loop based on the subset of the input frames, wherein the synthetic camera loop exhibits some amount of camera motion for the subset of the input frames; and
combine the video loop and the synthetic camera loop to generate an output video loop.

2. The non-transitory program storage device of claim 1, wherein the instructions to generate a synthetic camera loop comprise instructions that cause the one or more programmable control devices to smooth a camera trajectory corresponding to the subset of the input frames.

3. The non-transitory program storage device of claim 2, wherein the instructions to smooth a camera trajectory comprise instructions that cause the one or more programmable control devices to:
repeat an input camera trajectory for the subset of the input frames to create a looped camera trajectory;
smooth the looped camera trajectory to create a smoothed loop path; and
select a segment of the smoothed loop path as the synthetic camera loop.

4. The non-transitory program storage device of claim 3, wherein the instructions to repeat the input camera trajectory comprise instructions that cause the one or more programmable control devices to repeat the input camera trajectory for the subset of the input frames at least three times.

5. The non-transitory program storage device of claim 3, wherein the instructions to smooth the looped camera trajectory comprise instructions that cause the one or more programmable control devices to smooth the looped camera trajectory based on a Gaussian kernel.

6. The non-transitory program storage device of claim 5, wherein the Gaussian kernel has a fixed kernel radius.

7. The non-transitory program storage device of claim 5, wherein the Gaussian kernel has a kernel width that varies adaptively.

8. The non-transitory program storage device of claim 3, wherein the instructions to select a segment of the smoothed loop path comprise instructions that cause the one or more programmable control devices to select a center smoothed segment as the segment of the smoothed loop path.

9. The non-transitory program storage device of claim 1, wherein the loop parameters include a start frame, a loop period, and a crossfade.

10. A computer-implemented method for generating a video loop of frames, comprising:
obtaining a plurality of input frames;
applying a stabilization operation to the input frames to generate a plurality of stabilized frames;
generating a video loop based on a plurality of loop parameters and at least a portion of the stabilized frames, wherein frames within the video loop correspond to a subset of the input frames;
generating a synthetic camera loop based on the subset of the input frames, wherein the synthetic camera loop exhibits some amount of camera motion for the subset of the input frames; and
combining the video loop and the synthetic camera loop to generate an output video loop.

11. The computer-implemented method of claim 10, wherein generating a synthetic camera loop comprises smoothing a camera trajectory corresponding to the subset of the input frames.

12. The computer-implemented method of claim 11, wherein smoothing a camera trajectory comprises:
repeating an input camera trajectory for the subset of the input frames to create a looped camera trajectory;
smoothing the looped camera trajectory to create a smoothed loop path; and
selecting a segment of the smoothed loop path as the synthetic camera loop.

13. The computer-implemented method of claim 12, wherein repeating the input camera trajectory comprises repeating the input camera trajectory for the subset of the input frames at least three times.

14. The computer-implemented method of claim 12, wherein smoothing the looped camera trajectory comprises smoothing the looped camera trajectory based on a Gaussian kernel.

15. The computer-implemented method of claim 12, wherein selecting a segment of the smoothed loop path comprises selecting a center smoothed segment as the segment of the smoothed loop path.

16. An electronic device comprising:
an image sensor,
a memory operatively coupled to the image sensor, and
one or more processors operatively coupled to the memory and the image sensor, wherein the one or more processors are programmed to:
obtain a plurality of input frames;
apply a stabilization operation to the input frames to generate a plurality of stabilized frames;
generate a video loop based on a plurality of loop parameters and at least a portion of the stabilized frames, wherein frames within the video loop correspond to a subset of the input frames;
generate a synthetic camera loop based on the subset of the input frames, wherein the synthetic camera loop exhibits some amount of camera motion for the subset of the input frames; and
combine the video loop and the synthetic camera loop to generate an output video loop.

17. The electronic device of claim 16, wherein the one or more processors being programmed to generate a synthetic camera loop causes the one or more processors to be programmed to smooth a camera trajectory corresponding to the subset of the input frames.

18. The electronic device of claim 17, wherein the one or more processors being programmed to smooth a camera trajectory causes the one or more processors to be programmed to:
repeat an input camera trajectory for the subset of the input frames to create a looped camera trajectory;
smooth the looped camera trajectory to create a smoothed loop path; and select a segment of the smoothed loop path as the synthetic camera loop.

19. The electronic device of claim 18, wherein the one or more processors being programmed to repeat the input camera trajectory causes the one or more processors to be programmed to repeat the input camera trajectory for the subset of the input frames at least three times.

20. The electronic device of claim 18, wherein the one or more processors being programmed to smooth the looped camera trajectory causes the one or more processors to be programmed to smooth the looped camera trajectory based on a Gaussian kernel.

* * * * *